M. I. MAGOON.
HARNESS.
APPLICATION FILED APR. 11, 1910.
965,918.  Patented Aug. 2, 1910.
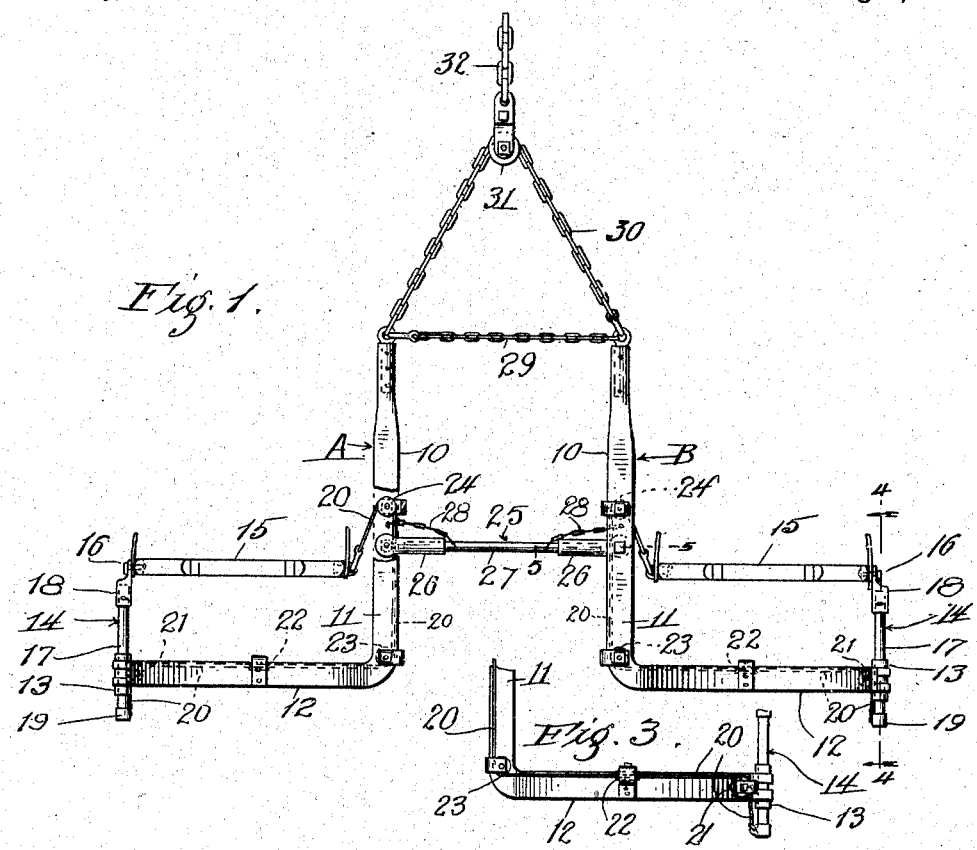
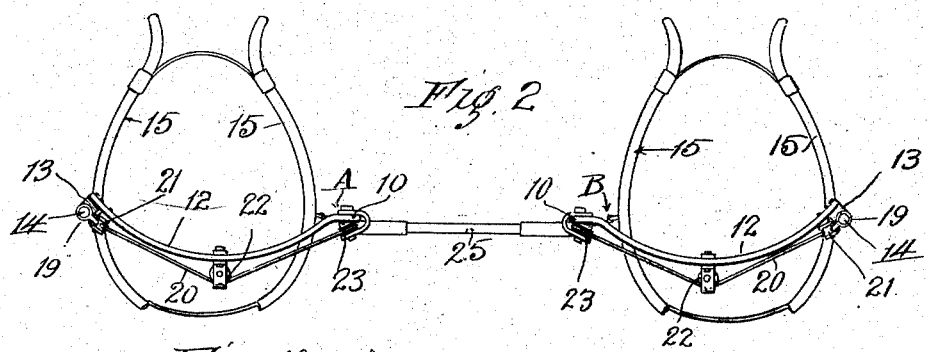
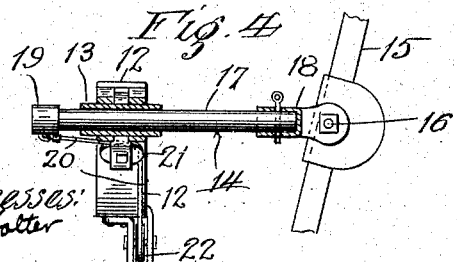
Inventor:
Marius I. Magoon,
by Charles O. Shervey
his Atty

UNITED STATES PATENT OFFICE.

MARIUS I. MAGOON, OF HAMMOND, INDIANA.

HARNESS.

965,918.  Specification of Letters Patent.  Patented Aug. 2, 1910.

Application filed April 11, 1910. Serial No. 554,617.

*To all whom it may concern:*

Be it known that I, MARIUS I. MAGOON, a citizen of the United States, residing at Hammond, in the county of Lake and State of Indiana, have invented new and useful Improvements in Harness, of which the following is a specification.

This invention relates to harness, and has for its object to simplify, cheapen and otherwise improve upon harness.

Another object is to provide means for transmitting the force exerted by a team of horses, to a single point between the horses, whereby such devices as eveners, whiffletrees and the like may be dispensed with.

To such ends this invention consists in certain novel features of construction, arrangement and combination of parts, a description of which will be found in the following specification, and the essential features of which are more particularly pointed out in the claims.

The device is clearly illustrated in the drawings furnished herewith in which—

Figure 1 is a plan of a harness, embodying my invention, Fig. 2 is a front view thereof, Fig. 3 is an inverted plan of a portion thereof, Fig. 4 is a detail, vertical, longitudinal section taken on the line 4—4 of Fig. 1. and Fig. 5 is a detail, vertical cross section taken on the line 5—5 of Fig. 1.

Referring to the drawings, A, B, represent the two main sections of the harness, each of which is adapted to be placed upon one of the horses of a team. Inasmuch as both sections are alike, except that one is right and one left, I shall proceed to describe one in detail, it being understood that such description refers to the other section as well. In each section, an L shaped frame 10, is provided, which has a longitudinally extending arm 11, and a transverse arm 12, that is bowed or curved downward as shown in Fig. 2, so as not to interfere with the neck of the horse upon which this portion of the harness is attached. At the outer end of the arm 12, is secured a guide 13, here shown in the form of an eye, and sliding in said guide is a push bar 14, one end of which is pivotally connected with one of the hames 15, as for instance by means of a bolt 16. The push bar preferably comprises a rod or tube 17, a socket 18, secured upon one end of the tube and a fastening device 19, secured upon the other end. A flexible connecting element, such as a cable, chain or the like 20, is attached to the connecting device 19, and connects the front end of the push bar 14, with the side of the hames 15, opposite the side to which the push bar is directly attached, and as shown said flexible connecting element 20, passes around pulleys 21, 22, 23 and 24, which guide said flexible element in such manner that the force exerted by the horse against the hames, is transmitted to the pulley 24, in a direction to draw the frame 10, forward. As shown, the roller 21, is behind the point of attachment of the cable with the push bar 14, and the roller 24, is behind the point of attachment of the cable with the hames 15, the other rollers 22, 23, being idlers and serving to guide the cable from the roller 21, to the roller 24. It will be observed that when the horse pushes forward on the hames, the push bar 14, is pushed forward in the guide 13, thereby pulling upon the adjacent end of the cable, and the opposite end of the cable is pulled forward by the hames, whereby the pull upon the cable is transmitted to the frame 10, at the point where the pulley 24, is secured thereto. It is also apparent that the hames are free to follow the movement of the shoulders of the horse as it steps forward, because the cable works back and forth around the pulleys.

The two harness sections A, B, thus far described are spaced apart by means of a spacing bar 25, which comprises sockets 26, pivotally secured to the longitudinal members 11, of the frames 10, and a tube or rod 27, slidably seated in said sockets. Chains 28, secured to the rod or tube 27, and frames 10, may be provided to limit the outward movement of the rod or tube 27, in the sockets 26. This arrangement of spacing bar allows a limited amount of movement between the two frames 10, of the harness sections A, B. The rear ends of the longitudinal arms 11, are connected by a chain 29, and a draft chain 30, extends rearward from the ends of said arms and is trained about a pulley 31, from which extends a chain 32, which may be attached to the device to be drawn along the ground. It will be observed that all of the power exerted against the hames of the two harness sections will be transmitted to the pulley 31, in the loop of the chain 30, and that in case either horse exerts more effort than the other, the power will still be transmitted to the pulley 31, in the loop of the chain 30.

From the above it will be readily seen that the usual tugs, eveners or whiffle-trees may be wholly dispensed with and yet all of the power exerted by the team brought to a central point. The harness is especially advantageous for use in drawing plows, harrows and the like over the ground, but may be used upon wagons or other agricultural implements.

I realize that various alterations and modifications of this device are possible without departing from the spirit of my invention, and I do not therefore desire to limit myself to the exact form of construction shown and described.

I claim as new and desire to secure by Letters Patent:

1. A harness comprising a pair of harness sections, each section having an L shaped frame, one arm of which is arranged to extend in front of the horse, a push bar guided in the end of the transverse arm of the L shaped frame, a pair of hames, one of which is secured to the rear end of the push bar, a flexible connecting element secured to the other hame and to the forward end of said push bar and pulleys on said L shaped frames, around which said flexible element is trained, one of said pulleys being located at a point behind the hames.

2. A harness comprising a pair of harness sections, each section having an L shaped frame, one arm of which is arranged to extend in front of the horse, a guide in the end of said transverse arm, a push bar guided therein, a pair of hames, one of which is attached to the rear end of the push bar, a cable attached to the other hame and to the front end of the push bar and pulleys on said L shaped frame, around which said cable is trained, one of said pulleys being located at a point behind the hames.

3. A harness, comprising a pair of harness sections, each having an L shaped frame formed with a downwardly bowed transverse arm, a push bar guided in the end of said transverse arm, a pair of hames, one of which is secured to the rear end of said push bar, a cable secured to the other hame and to the front end of the push bar, and pulleys on said L shaped frame, around which said cable is trained, one of said pulleys being located at a point behind the hames, a strut connecting said L shaped frames and a flexible connection extending rearward from the rear ends of said L shaped frames.

4. A harness, comprising a pair of harness sections, each having an L shaped frame formed with a downwardly bowed transverse arm, a push bar guided in the end of said transverse arm, a pair of hames, one of which is secured to the rear end of said push bar, a cable secured to the other hame and to the front end of the push bar, and pulleys on the L shaped frame, around which said cable is trained, one of said pulleys being located at a point behind the hames, a strut connecting said L shaped frames, a flexible connection extending rearward from the rear ends of said L shaped frames, and a pulley engaging said flexible connection.

5. In a harness, the combination with two L shaped frames, pulleys thereon, two pairs of hames, connecting mechanism between the hames and the L shaped frames, including push bars attached to the outer sides of the hames and cables attached to the inner side of the hames and to the push bars, and trained around the pulleys on the frames to points behind the hames, a longitudinally extensible brace between the frames, a cross chain at the rear of said frames, a chain extending rearward from said frames and a pulley engaging said rearwardly extending chain.

MARIUS I. MAGOON.

Witnesses:
CHARLES O. SHERVEY,
ELMER A. VINNEDGE.